United States Patent

Wronke et al.

[15] 3,701,373

[45] Oct. 31, 1972

[54] GROMMET TYPE FASTENER

[72] Inventors: Louis J. Wronke, Hillpoint, Wis.; John A. Pestka, Park Ridge, Ill.

[73] Assignee: Illinois Tool Works Inc., Chicago, Ill.

[22] Filed: March 3, 1971

[21] Appl. No.: 120,505

[52] U.S. Cl. ................... 151/41.75, 24/73 PF, 85/80
[51] Int. Cl. .............................................. F16b 13/06
[58] Field of Search ....... 151/41.75, 7; 85/80, 82, 83, 85/70, 71, DIG. 2, 35, 5 R; 24/73 PF, 73 HS, 208 A, 216, 217

[56] References Cited

UNITED STATES PATENTS

| | | | |
|---|---|---|---|
| 3,143,916 | 8/1964 | Rice | 85/71 |
| 3,200,694 | 8/1965 | Rapata | 85/82 |
| 3,342,098 | 9/1967 | Schuplin | 85/83 |
| 3,574,899 | 4/1971 | Fisher | 151/41.75 X |

*Primary Examiner*—Ramon S. Britts
*Attorney*—Olson, Trexler, Wolters & Bushnell

[57] ABSTRACT

The present invention relates generally to improvements in plastic fasteners and more particularly to the provision of a unique and improved one-piece plastic grommet type anchor member for accommodating the threaded shank of a screw member when positioned within a work aperture. The anchor member disclosed herein includes a head section for clampingly engaging one side of an apertured workpiece, and a shank section comprising an elongate hollow portion for accommodating a screw shank, and diametrically disposed peripherally positioned shank arms integrally connected with and extending axially between underside of the head section and the entering extremity of said hollow portion.

6 Claims, 7 Drawing Figures

PATENTED OCT 31 1972    3,701,373
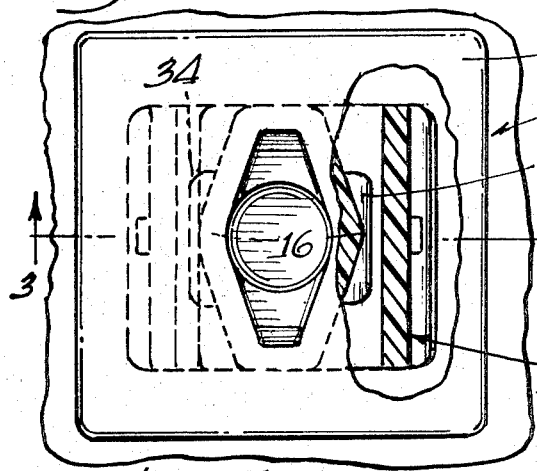
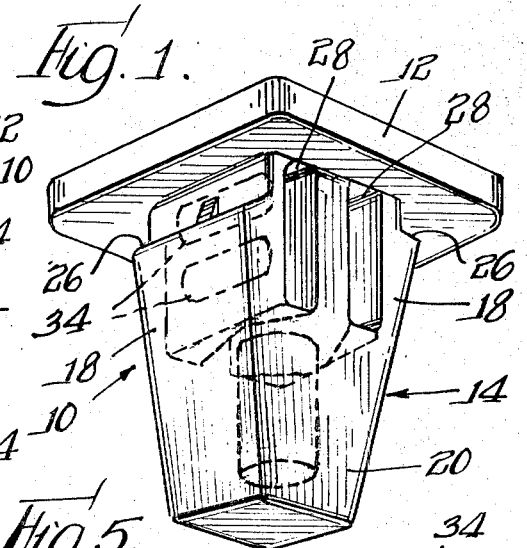
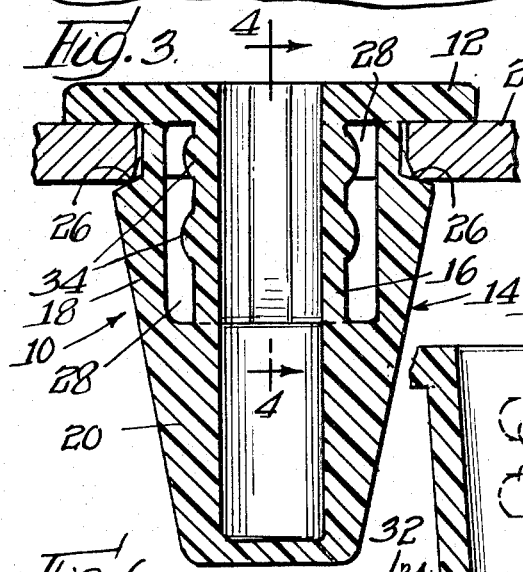
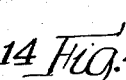
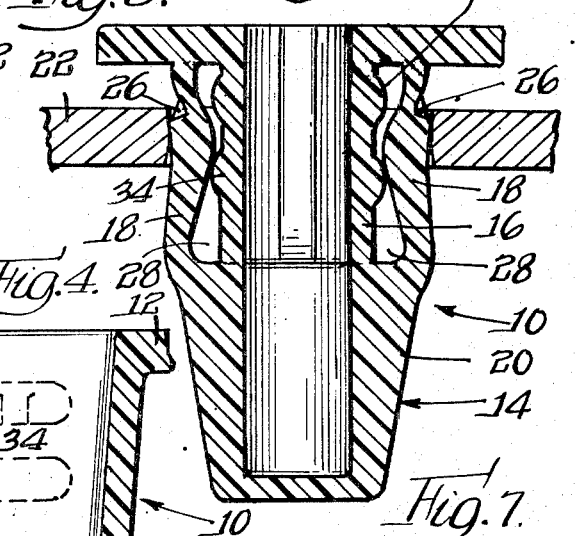
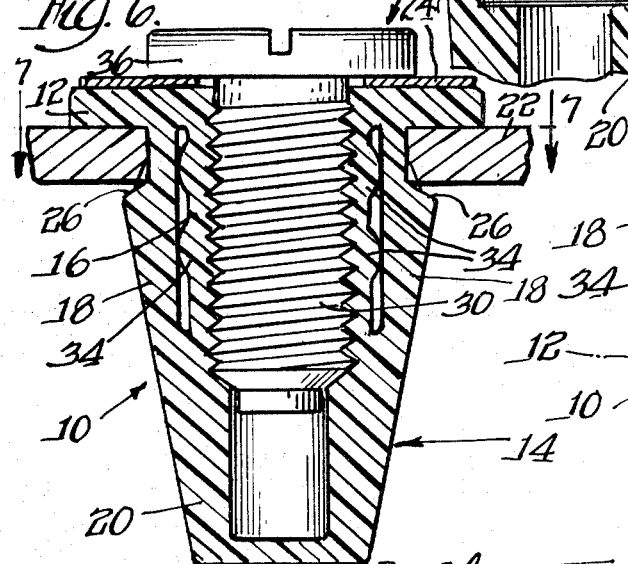
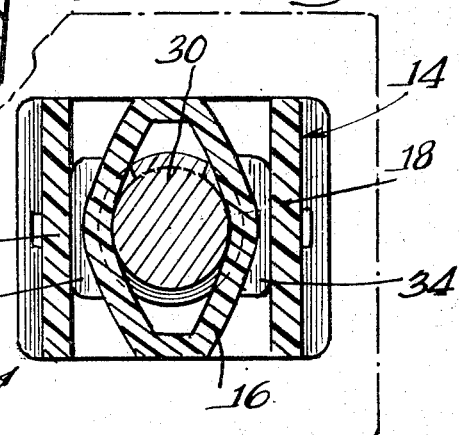
Inventors
John A. Pestka
Louis J. Wronke
By Olson, Trexler, Wolters, & Bushnell attys 3,701,373

GROMMET TYPE FASTENER

SUMMARY OF THE INVENTION

Grommet type anchor members for accommodating a threaded shank of a screw member have heretofore been employed to secure a pair of workpieces together in spaced relation and electrically apart. Such commercial anchor members heretofore available have been found to be unsuitable for use in instances where it is important that the screw member be electrically insulated. Complete electrical insulation is required in some instances to prevent electrical contact between the screw member and the metallic sheet with which the anchor member is to be used. The present invention contemplates a one-piece plastic grommet or anchor member for accommodating a screw member in such a manner that when the screw is completely tightened within the anchor member, the shank of the screw will be completely encapsulated by the grommet shank and hence the potential hazard of electrical arcing is eliminated.

More specifically, it is an object of the present invention to provide an improved grommet type anchor member as set forth above which will not only exhibit the aforesaid electrical insulating properties, but because of the unique, laterally expandable peripheral structure, an increase in work-gripping aggressiveness is obtained.

Still more specifically, the present invention contemplates a one-piece plastic grommet type anchor member in which the entering extremity of the screw shank accommodated thereby is completely encased within a plastic shell when finally tightened in position.

BRIEF DESCRIPTION OF THE DRAWING

The foregoing and other objects and advantages will be more apparent from the following description when considered in connection with the accompanying drawing wherein:

FIG. 1 is a perspective view of a one-piece grommet anchor member of the type contemplated by the present invention;

FIG. 2 is a plan view of the anchor member shown in FIG. 1, a portion of the head section broken away, more clearly to illustrate the shank structure extending axially from the underside of the head section;

FIG. 3 is a central, vertical, sectional view of the anchor member taken substantially along the line 3—3 of FIG. 2, before the screw member has been associated therewith;

FIG. 4 is a fragmentary detailed, sectional view taken substantially along line 4—4 of FIG. 3;

FIG. 5 is a central, vertical, sectional view similar to FIG. 3, disclosing the shank of the anchor member partially inserted within the work aperture;

FIG. 6 is a view similar to FIG. 3, after the anchor member has been fully inserted within the work aperture and secured in final position by the screw member; and, FIG. 7 is a vertical, sectional view taken substantially along the line 7—7 of FIG. 6, a head section of the anchor being shown by dot and dash lines.

DESCRIPTION OF THE PREFERRED EMBODIMENT

Referring now to the drawing more in detail, wherein like numerals have been employed to designate similar parts throughout the various views, it will be seen that a one piece plastic anchor member of the type contemplated by the present invention is designated generally by the numeral 10.

A central longitudinally apertured and laterally expandable screw accommodating portion is designated by the numeral 16. In the disclosed embodiment the shank portion 16 is substantially diamond-shaped in transverse cross section as clearly illustrated in FIG. 7. Oppositely disposed laterally yieldable arms 18 extend between and are formed integral with the head section 12 and an entering shank portion 20. The entering portion 20 is tapered to facilitate insertion within a complementary aperture in a worksheet 22.

Each of the arms 18 provide shoulder 26 for engaging the surface of the work oppositely disposed from the surface engaged by the head section 12. Sufficient space or opening 28 is provided between the outer periphery of the shank portion 16 and the inner surfaces of the arms 18 to enable said arms to spring inwardly, as shown in FIG. 5, upon initial insertion of the shank 14 in a complementary work aperture. In the disclosed embodiment the work aperture is polygonal in shape to accommodate the polygonal shape defined by the shank periphery immediately adjacent the head section 12. The inherent resiliency of the arms 18 is such as to enable insertion of the anchor member as shown in FIG. 5, and to cause said arms automatically to spring outwardly to thereby effect clamping engagement of the shoulders 26 with the underside of the worksheet 22 as shown in FIG. 3. With the anchor member so positioned, it is in readiness to accommodate the threaded shank 30 of a screw member 32, FIG. 6. A second panel 24 is positioned on the outer surface of head section 12 and telescopic insertion of the screw shank 30 causes the oppositely disposed walls of the shank portion 16 to expand thereby urging protuberances 34 into firm impingement with the adjacent inner surfaces of the arms 18. Upon tightening the screw 32 so as to clamp the head 36 thereof to firm impingement with the outer surface of the worksheet 22, the shoulders 26 of the arms 18 are brought into firm engagement with the undersurface of the worksheet 22.

As previously stated the screw accommodating portion 16 of the shank section 14 is substantially diamond-shaped in transverse cross section. This construction increases the lateral flexibility of the oppositely disposed areas of the screw accommodating portion 16 which support the protuberances 34. The maximum diameter of the screw shank 30 is greater than the internal minimum diameter of the shank portion 16, and therefore as the screw shank forms its own thread withing the portion 16 the protuberances are urged laterally in opposite directions into impingement with the inner surfaces of the arms 18.

Attention is directed to the fact that the entering extremity of the shank 14 is completely closed so that the screw shank 30 is encapsulated, and thereby electrically insulated with respect to the metallic worksheet 22. Hence, the potential hazard of arching between the worksheets and screw shank is eliminated. The design of the above described anchor member or grommet 10 is such as to permit it to be molded in one piece by the practice of conventional molding methods. Hence, the cost of production is greatly minimized. The laterally yieldable walls of the shank portions 16 have sufficient rigidity or firmness to cause the screw shank 30 to indent thread convolutions along the inner opposed surfaces of the shank portion 16, and yet the resiliency of said shank portion 16 is sufficient to yield laterally when a screw shank is associated with said portion, thereby urging the locking protuberances 34 into aggressive engagement with the arms 18.

What is claimed is:

1. A one piece plastic anchor member for application to an apertured workpiece in combination with a threaded shank of a screw member, said anchor member including a head section providing a surface for clampingly engaging one side of a workpiece, and a shank section extending axially from said head section, said shank section including an elongate hollow portion for accommodating a screw shank, the trailing extremity of which is laterally yieldable, and diametrically disposed peripherally positioned shank arms integrally connected with and extending axially between the entering extremity of said hollow portion and the underside of the head section, the inner surfaces of said arms being normally disposed outwardly from the external periphery of the trailing extremity of said hollow screw accommodating portion leaving spaces therebetween, work engaging peripheral shoulder means associated with said arms and spaced axially from the underside of said head section, said shank arms being readily collapsible into the spaces between the arms and the screw accommodating portion to permit insertion of said shank section within a complementary work aperture, said trailing extremity of said hollow portion presenting walls which are laterally expandable into the spaces therebetween and said arms and which define a minimum internal diameter less than the maximum diameter of the screw shank for lateral expansion thereof upon insertion of the screw shank with the lateral extent of each of the spaces being not greater than one-half the difference between said minimum internal diameter of said walls and said maximum diameter of said screw shank, whereby the walls are urged into abutment with the inner surfaces of said arms as an incident to the application of a screw member to said trailing extremity.

2. A one piece plastic anchor member for application to an apertured workpiece as set forth in claim 1, wherein the elongate hollow portion of the shank section is closed so as to electrically insulate from an associated workpiece, a screw shank accommodated by said hollow portion.

3. A one piece plastic anchor member for application to an apertured workpiece as set forth in claim 1, wherein the outer periphery of the trailing extremity of the screw accommodating portion of the shank section is provided with protuberant means for impinging adjacent inner surfaces of said shank arms.

4. A one piece plastic anchor member for application to an apertured workpiece as set forth in claim 1, wherein the shank section is reduced in external diameter toward the entering extremity thereof to facilitate telescopic association of said shank section with a complementary work aperture.

5. A one piece plastic anchor member for application to an apertured workpiece as set forth in claim 1, wherein the hollow portion of the trailing extremity of the shank section has a minimum diameter for accommodating a screw shank and a greater maximum diameter for enhancing the lateral yieldability of the shank wall defining said aperture.

6. A one piece plastic anchor member for application to an apertured workpiece as set forth in claim 1, wherein the hollow portion of the trailing extremity of the shank section is substantially diamond-shaped in transverse cross section.

* * * * *